United States Patent
Tanaka et al.

[11] Patent Number: 5,963,699
[45] Date of Patent: Oct. 5, 1999

[54] OPTICAL FIBER MECHANICAL SPLICE

[75] Inventors: Toshiyuki Tanaka, Sakura; Yasuhiro Tamaki, Yachiyo; Hiroshi Yokosuka, Sakura; Shinji Nagasawa, Mito; Mitsuru Kihara, Tokorozawa, all of Japan

[73] Assignees: Fujikura Ltd.; Nippon Telegraph and Telephone Corporation, both of Tokyo, Japan

[21] Appl. No.: 08/862,395

[22] Filed: May 23, 1997

[30] Foreign Application Priority Data

May 30, 1996 [JP] Japan .................................. 8-137206

[51] Int. Cl.⁶ .................................................. G02B 6/255
[52] U.S. Cl. .............................. 385/97; 385/95; 385/65; 385/83
[58] Field of Search ................................ 385/97, 95, 96, 385/98, 99, 147, 70, 83, 65, 87, 139

[56] References Cited

U.S. PATENT DOCUMENTS

| 4,208,095 | 6/1980 | Malsot ................................. 350/96.21 |
| 4,593,972 | 6/1986 | Gibson ...................................... 385/70 |
| 4,717,233 | 1/1988 | Szkaradnik .............................. 385/98 |
| 5,440,657 | 8/1995 | Essert ........................................ 385/71 |
| 5,708,746 | 1/1998 | Kim et al. ................................. 385/95 |

FOREIGN PATENT DOCUMENTS

| 0 122 169 A2 | 10/1984 | European Pat. Off. . |
| 41 12 438 C1 | 8/1992 | Germany . |
| 43 35 861 A1 | 4/1994 | Germany . |
| 53 087 246 | 8/1978 | Japan . |
| WO 97/08575 | 3/1997 | Japan . |
| WO 86/01306 | 2/1986 | WIPO . |

OTHER PUBLICATIONS

Copy of European Search Report dated Sep. 25, 1997.

*Primary Examiner*—Phan T. H. Palmer
*Attorney, Agent, or Firm*—Finnegan, Henderson, Farabow, Garrett & Dunner, L.L.P.

[57] ABSTRACT

Productivity of switching optical connections is improved significantly with the mechanical splice presented. A single fiber cable or a fiber tape, with the bare fiber exposed at the tip, is inserted from the terminal ends of an aligner element, and are clamped between a lid and a base member of the aligner element, A U-shaped spring clamp is coupled to the aligner element to secure the cables clamped in the aligner element. After the aligner element is closed and coupled into the spring clamp, wedge insertion openings provided in the front face of the aligner element enable to lift the lid member from the base member sufficiently to enable removal of one or both of the cables. The mechanical splice is constructed simply and ruggedly so that cables can be connected or disconnected manually by coupling the aligner element into or decoupling from the spring clamp. The external shape of the aligner is angular, and permits stable handling on workbench or with tools, thus leading to improved productivity in field installation as well as in assembly operations.

9 Claims, 6 Drawing Sheets

OPTICAL FIBER MECHANICAL SPLICE

BACKGROUND OF THE INVENTION

1. Field of the Invention

The present invention relates to an optical fiber aligning device used for optically aligning butt jointed fibers such as mechanically spliced fibers, and relates also to an optical aligner assembly using the aligning device.

2. Description of the Related Art

Conventionally, optical fiber aligners are designed to provide an optical connection by abutting two optical fibers end-to-end, and securing the butted fibers within one aligner housing.

There are three main methods for aligning the fibers in the conventional optical aligners, they are: (1) a fine hollow tube (hereinbelow referred to as microcapillary tube) is used to insert one fiber from each end to abut the ends of two fibers; (2) a positioning groove is used to abut the ends of two fibers; and (3) the centers of three precision rods or three precision spheres are used to align two fibers at their centers. The conventional optical fiber aligner utilizes the aligning device to align, abut the ends, and the fibers are then fixed in place by attaching the fibers to the device using an adhesive or some mechanical device.

However, such fiber aligners are not reusable because the aligned optical fibers are not removable, so that the fibers cannot be disconnected from or reconnected in the aligner housing, and therefore, the conventional aligners have been deemed to be unsatisfactory because they cannot be used effectively for connecting or switching an optical circuit.

Furthermore, the task of aligning a pair of fibers along their optical axes requires extreme precision and the productivity was low. For example, it is necessary to carry out the work of inserting the fibers into a capillary tube under an optical microscope, and consequently, the assembly work was time consuming. Therefore, there has been a demand for developing optical fiber aligners and fiber aligning devices which permit improved efficiency in making and altering optical connections, particularly in the field work.

To resolve such problems of productivity, an alternative might be to insert the fibers through a lower precision guide groove or microcapillary tube, however, in many cases, the change in the alignment precision for the aligning device and the insertion facilitator is too sudden, thus causing the fibers to bind in the aligner to impede smooth entry of the fibers, and it was judged that such a device would be unsatisfactory for practical purposes.

SUMMARY OF THE INVENTION

It is an object of the present invention to provide an economical optical mechanical splice to facilitate making an optical circuit by aligning butted optical fibers or altering the optical circuit by disconnecting or reconnecting the fibers.

The object has been achieved in an optical mechanical splice comprising: an aligner element having a split-rod configuration comprised of a base member and a lid member for clamping an optical fiber in-between to provide a cable housing unit; a spring clamp having a U-shaped profile for retaining the cable housing unit closed by clamping the aligner element within an open section and providing vertical compression forces; a fiber housing groove, for retaining the optical fiber inserted between opposing surfaces which are formed on an opposing lid surface of the lid member and/or an opposing base surface of the base member; wherein the open section is shaped to enable insertion of the aligner element, and a longitudinal middle section of the fiber housing groove is shaped to accommodate abutted bare optical fibers for optical aligning, and the fiber housing groove is arranged so as to enable optical aligning of the optical fibers inserted through each end of the aligner element by abutting the bare optical fibers in the longitudinal middle section.

According to the mechanical splice presented, the aligner is assembled simply by inserting an aligner element into a spring clamp through the open section of the spring clamp. The U-shape of the spring clamp prevents it from rolling freely on the workbench and makes it possible to be held in some holding fixture, and facilitates assembly of the aligner and improves the productivity of carrying out such optical circuit connecting and switching tasks.

An advantage of the design of the U-shaped open section of the spring clamp is that the tasks related to optical circuit switching operations can be carried out more efficiently by using such tools as wedges, inserted between the lid member and the base member, to force the opening wider, to relieve the clamping force, and moreover, if the aligner element is made of a transparent material, the work can be carried out while visually verifying the progress of work through the large area of the opening section. The large area of the opening of the spring clamp means also that physical access to the aligner is expedited if the aligner element has to be removed for adjustments.

Another aspect of the optical mechanical splice is that the aligner element is positioned in a pre-determined location within the spring clamp by means of a coupling configuration provided by a protrusion positioning section formed on each flange section of the spring clamp, and a depression positioning section formed on each outer surface of the lid member and the base member.

According to this design of the assembly, the location of the aligner element within the spring clamp is defined by the presence of the surface configuration comprising protrusions and depressions formed, respectively, on the clamp and the outer surfaces of the aligner element. Further, this arrangement ensures that the compression force of the spring clamp is always applied in the normal direction to the fibers.

Another aspect of the mechanical splice is that a low-precision groove, having a lower alignment precision relative to an alignment precision of the fiber housing groove, is provided at each longitudinal end of the aligner element to communicate with the fiber housing groove so as to enable an optical fiber to be inserted in the fiber housing groove from each entry guide section of the low-precision groove.

According to this design of the assembly, the task of inserting the fibers into the middle region of the fiber housing groove from each end opening is simplified. The low-precision groove guides the fiber deeper into the aligner element to slide into the higher precision grooves to be aligned in the middle section of the aligner element so that the butt joined fibers are ultimately within an allowable range of alignment of the optical axes of the two fibers. The optical cables applicable to the mechanical splice generally range from several tens of $\mu$m to several hundreds of $\mu$m at their outer cladding. Therefore, the design of the optical mechanical splice enables two fiber cables to be optically aligned simply by removing a given length of cladding from the tip ends of each cable and inserting the bared cables from the fiber entry opening at each end of the aligner element.

The fiber housing grooves can be given a V-shaped profile, other profile shapes such as a U-, approximate V- and U-shapes are permissible, as are other variations including some combinations of all such shapes. It is further permissible to incorporate other alignment facilitators such as microcapillary tubes within the aligner element.

DESCRIPTION OF THE PREFERRED EMBODIMENTS

A first embodiment of the mechanical splice of the present invention will be presented with reference to FIGS. 1 to 5.

Figure 1:
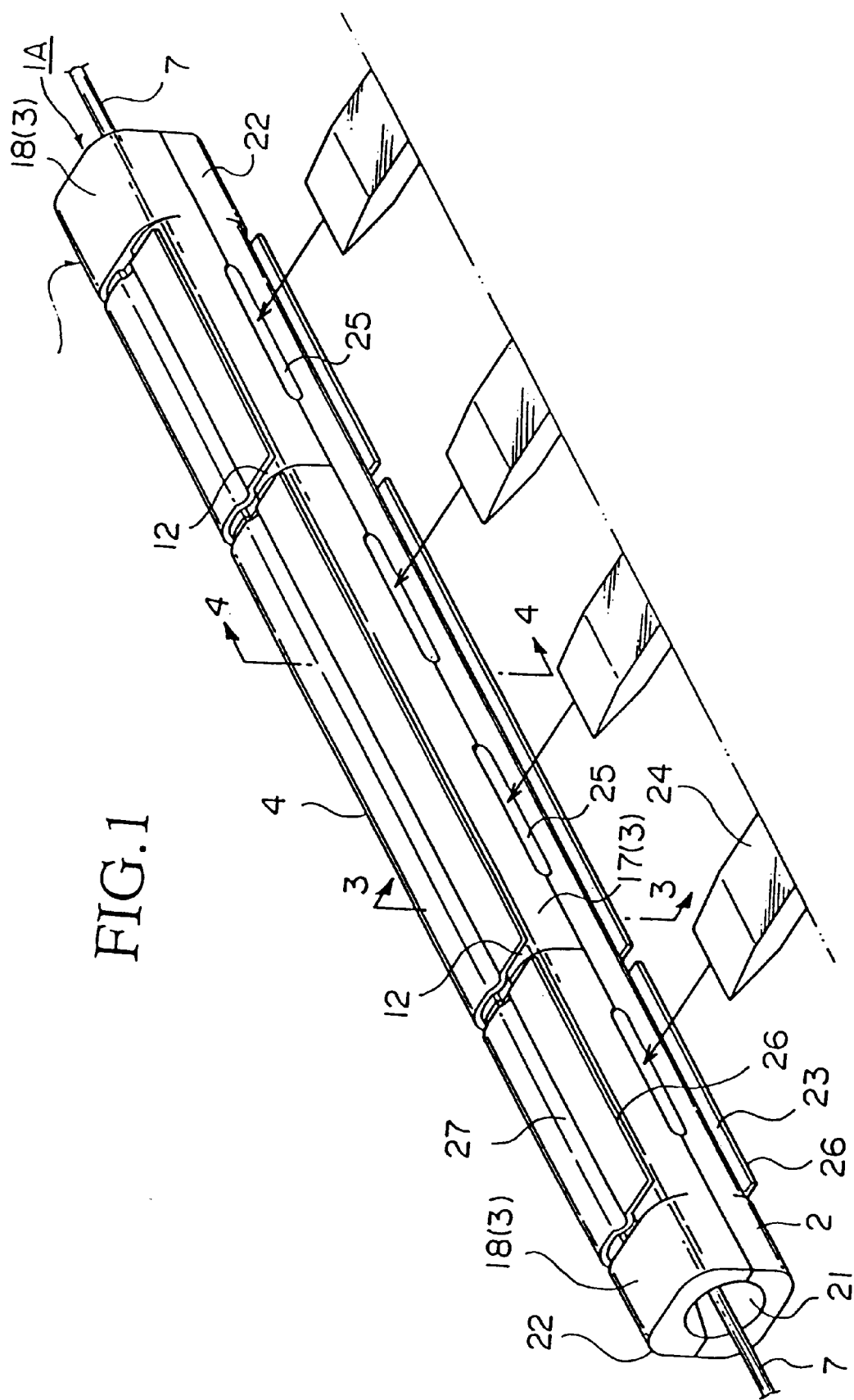
FIG. 1 is an overall perspective view of a first embodiment of the optical fiber mechanical splice of the present invention in the closed state.
Figure 2:
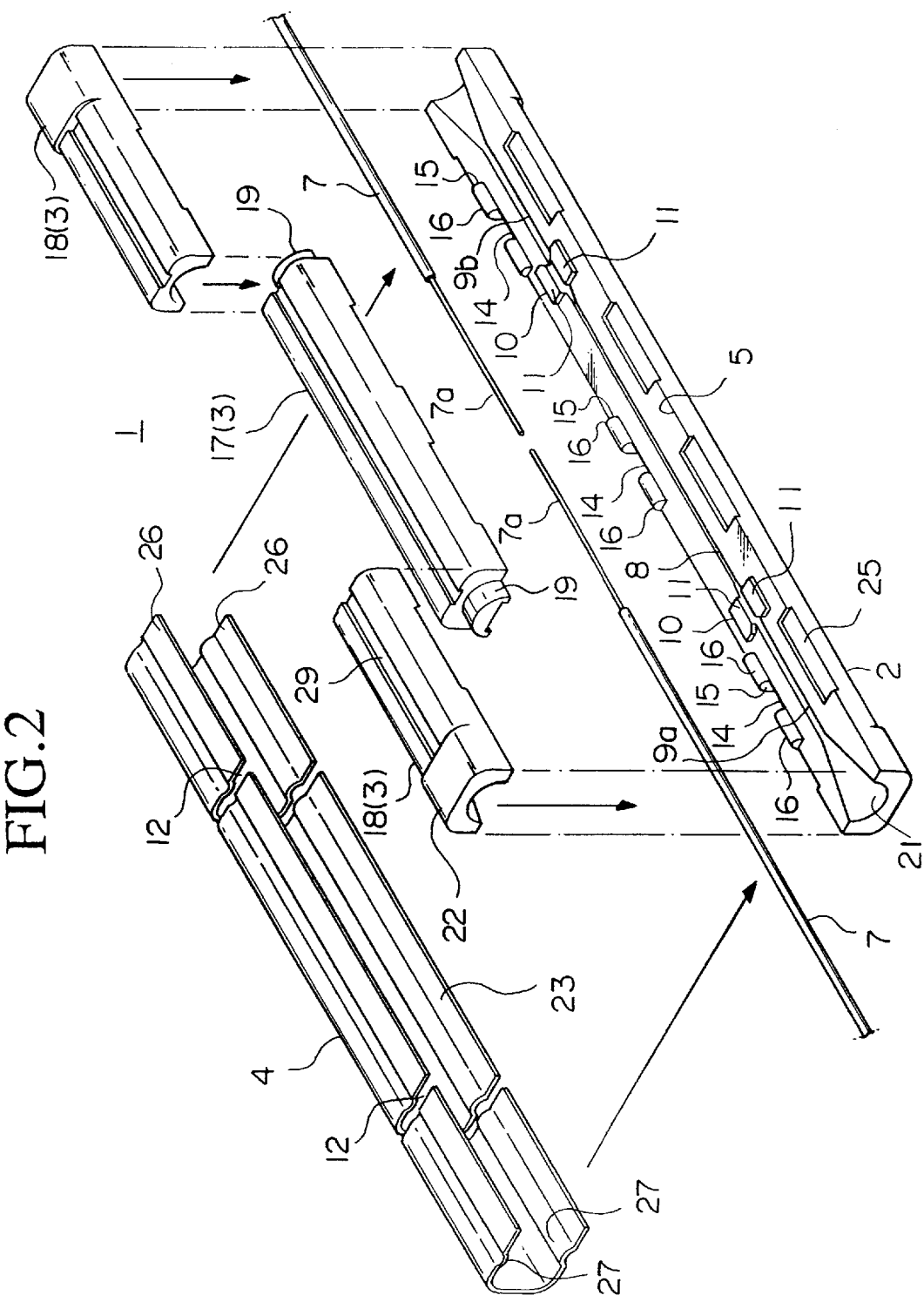
FIG. 2 is an exploded perspective view of the optical fiber mechanical splice shown in FIG. 1.

As shown in FIGS. 1 and 2, the optical fiber mechanical splice (hereinbelow shortened to aligner) 1 comprises an aligner element 1A comprising a base member 2 and a lid member 3, respectively constituted by each half section of a split rod, presenting a rectangular profile when closed; and a thin and long spring clamp 4, having a U-shaped profile, which approximately encases the entire structure of the aligner element 1A.

Figure 3:
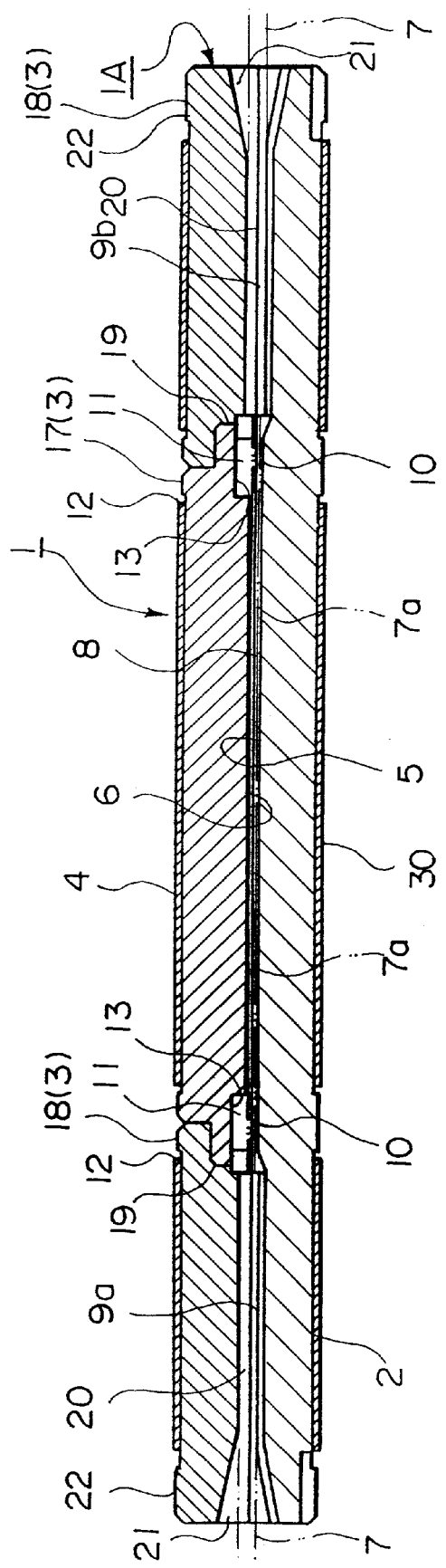
FIG. 3 is a cross sectional view of the optical fiber mechanical splice seen through a plane A—A in FIG. 1.

As shown in FIGS. 2 and 3, the base member 2 and the lid member 3 themselves present a rectangular profile, and are assembled into a fiber housing unit by closing the lid member 3 on the base member 2 thereby placing the respective opposing base surface 5 and the lid surfaces 6 in contact. In this embodiment, the base member 2 and the lid member 3 are made of a plastic material having a suitable hardness value. The base and lid surfaces 5, 6 extend over the entire lengths in the longitudinal direction of the base member 2 and the lid member 3 to form rectangular surfaces.

As shown in FIGS. 2 and 3, a fiber housing V-groove 8 extending in the longitudinal direction of the base member 2 is disposed in the longitudinal middle section of the base surface 5, and low-precision grooves 9 (9a,9b) are formed at each longitudinal end of the fiber housing V-groove 8 to extend collinearly with and communicate with the fiber housing V-groove 8. The fiber housing V-groove 8 is for abutting, positioning and aligning the single optical fibers 7 (resin-coated optical fibers) inserted from each terminal end of the aligner unit. The low-precision grooves 9 are used to align the fibers 7 at a lower precision relative to the aligning precision of the fiber housing V-groove 8. Although the overall precision capability of the low-precision groove 9 is less than the precision capability of the fiber housing V-groove 8, those regions in the vicinity of both ends of the fiber housing V-groove 8, referred to as guide sections 10, are made to a higher aligning capability. The guide section 10 adjacent to the fiber housing V-groove 8 is given about the same alignment precision as that of the V-groove 8. The guide section 10 adjacent to the low-precision groove 9 is made into a tapered groove of an expanded size larger than the size of the low-precision groove 9. The size of the taper is such as to permit a bare optical fiber 7a, with cladding removed, to be inserted easily through the low-precision groove 9.

There are small walls 11 disposed at both lateral edge of the guide section 10. The small wall 11 is made integrally with the base member 2 to protrude outward from the base surface 5 of the base member 2, so they can be readily manufactured by a single molding process.

The bare optical fiber 7 with its cladding removed from the tip is housed in the fiber housing V-groove 8 while the optical cable with cladding is housed in the low-precision groove 9. It is possible to insert the clad cable into the guide section 10.

Figure 4:
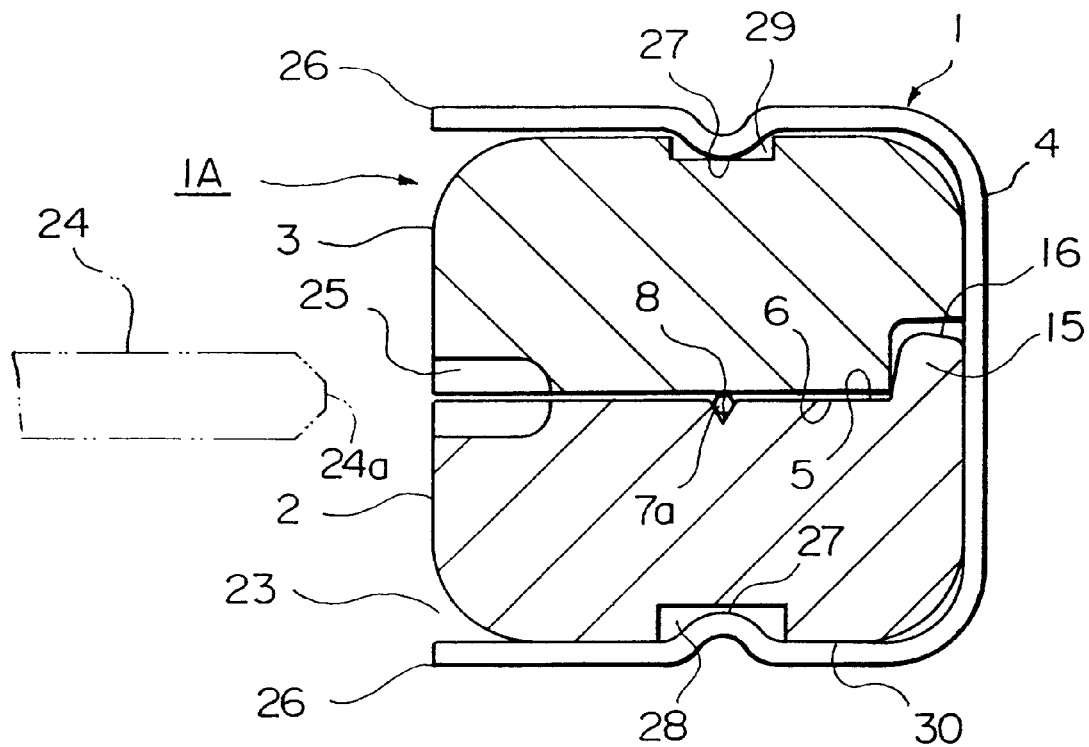
FIG. 4 is a cross sectional view of the optical fiber mechanical splice seen through a plane B—B in FIG. 1.
Figure 5:
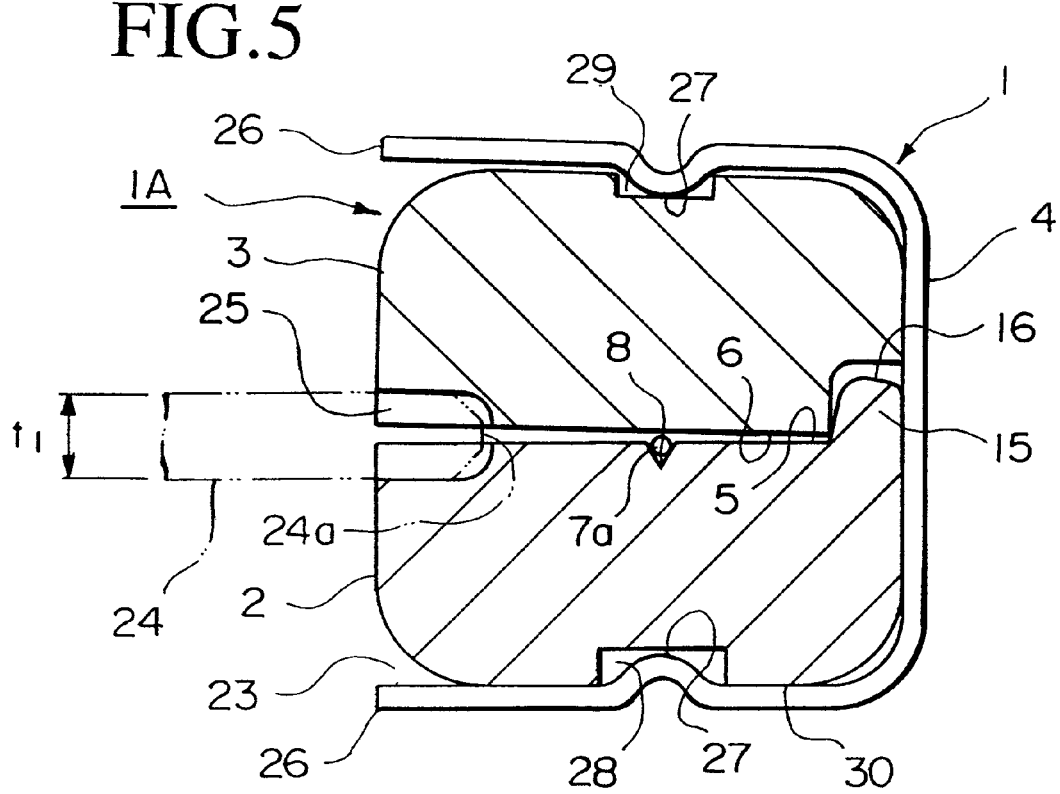
FIG. 5 is a cross sectional view of a vicinity of a fiber housing V-groove showing insertion of a wedge in the aligner element to release the clamping force on the optical fiber (resin-coated optical fiber) housed optical fiber mechanical splice shown in FIG. 1.

As shown in FIG. 2, a protrusion engaging section 15 is provided at three locations, in the longitudinal direction, on the base surface 5 of the base member 2 to engage with a depression engaging section 14 provided at the corresponding locations of the lid surface 6, as well as a depression engaging section 14 to engage with each of the protrusion engaging sections 15 formed on the lid surface 6 of the lid member 3. At the tip end of the protrusion section 15, a curved surface 16, which can be rotated with respect to the depression engaging section 14, is provided so that, as illustrated in FIGS. 4 and 5, when the lid member 3 is closed on the base member 2, the paired engaging sections 14, 15 are all engaged and the axis of rotation of all the engaged pairs is collinear along the lateral side (right end in FIGS. 4, 5) of the aligner element 1A so that the lid member 3 can be rotated relative to the base member 2 about the axis of rotation. Furthermore, the axial line (for the relative rotation of the lid member 3 with respect to the base member 2) is parallel to the axial line of the aligner 1, and because the rotational axial line is disposed to one lateral side of the optical fiber aligner 1, so the paired engaging sections 14, 15 serve the function of a mechanical hinge for the base member 2 and the lid member 3.

The lid member 3, as shown in FIGS. 2 and 3, is constituted by three sections comprising a middle lid 17 to press down on the fiber housing V-groove 8 on the base member 2, two linearly disposed terminal lids 18 to press down on the low-precision grooves 9. These middle lid 17 and the terminal lids 18 correspond to the interconnected sections disclosed in claim 6. The middle lid 17 and the terminal lids 18 are assembled by abutting the connecting sections 19 disposed protrudingly towards each other above the guide section 10. The terminal lids 18 and the middle lid 17 can be located properly on the base member 2, by housing the guide sections 10 into the small wall accommodation cavity 13 disposed on each of the connecting sections 19 as shown in FIG. 3.

As shown in FIG. 3 also, each of the terminal lids 18 is provided with a cable housing groove 20 to accommodate the upper section of the cladding on the optical fiber 7 (upper side in FIG. 3) disposed in the low-precision grooves 9.

The lid surface 6 on the middle lid 17 is a flat surface, however it is possible to provide a bare fiber housing groove to accommodate the top portion of the bare fiber 7a housed in the fiber housing V-groove 8. By adopting such a design, it becomes possible to install a bare fiber 7a of a larger diameter.

As shown in FIGS. 2 and 3, the terminal ends of the aligner element 1A are provided with a funnel-shaped fiber entry opening 21 for facilitating the insertion of coated fiber 7. Also, the exposed sections 22, which are always exposed beyond the spring clamp 4, are provided at the longitudinal ends of the aligner element 1A, and they are shaped angular so that whole mechanical splice can be gripped with some tool.

As shown in FIGS. 1, 4 and 5, on the lateral face opposite to the depression engaging section 14 and the protrusion engaging section 15 of the aligner element 1A, wedge insertion openings 25 are provided for separating the base member 2 from the lid member 3 by inserting wedges 24. The wedge insertion opening 25 is formed by carving out the opposing base and lid surfaces 5, 6, respectively, of the base member 2 and the lid member 3 at four locations in the longitudinal direction of the aligner element 1A. Insertion of the wedge 24 against the clamping force of the spring clamp 4 forces the lid member 3 to separate from the base member 2. The aligner element 1A is inserted into the spring clamp 4 so as to permit access to the wedge insertion opening 25 through the open section 23 of the spring clamp 4.

When the wedge 24 is pressed into the wedge insertion opening 25, the lid member 3 separates from the base member 2 by undergoing a relative rotation about the rotation axis of the hinge axis so that the wedge insertion opening 25 will move in the direction of expanding the spacing of the wedge insertion opening 25.

The wedge 24 is inserted into the wedge insertion opening 25 by abutting a planar end surface 24a of the wedge 24 to the furthest region of the wedge insertion opening 25. The wedge 24 has a thickness $t_1$ corresponding to a targeted opening width for the wedge insertion opening 25 so that simple insertion of the wedge 24 into the wedge insertion opening 25 is sufficient to always provide a constant opening dimension for the wedge insertion opening 25.

The spring clamp 4 is a long and thin member having a somewhat shorter length dimension than the aligner element 1A, and is made of a material such as beryllium copper. In the case of beryllium copper, it is more preferable to use those parts that have been formed into a proper shape and given a hardening treatment, and apply a coating such as a fluoride resin coating after the heat treatment. The aligner element 1A is pressed into the spring clamp 4 by pushing open a pair of (top and bottom) flange sections 26 with the aligner element 1A through an open section 23. In the transverse middle section of each of the flange sections 26, there is provided a positioning protrusion section 27 made by bending a portion of the flange section 26. The function of the positioning protrusion sections 27 is to assure a stable positioning of the aligner element 1A at a given location within the spring clamp 4, by coupling the top and bottom positioning protrusion sections 27 with the corresponding positioning depression sections 29, 28 formed on the lid member 3 and the base member 2, respectively.

The positioning protrusion sections 27 correspond to the coupling configuration, comprising protrusions and depressions, disclosed in claim 2.

The positioning protrusion sections 27 are provided on both top and bottom flange sections 26 in an opposing symmetry, and the positioning depression sections 28, 29 are formed in the middle transverse regions (left/right direction in FIG. 4) of the base member 2 and the lid member 3. When the aligner element 1A is clamped between the flange sections 26 of the spring clamp 4, all of the parts, positioning protrusion sections 27, positioning depression sections 28, 29 and the fiber housing V-groove 8 are disposed collinearly along a longitudinal axis so that a stable clamping force is applied in the diametrical direction of the optical fiber 7 placed in the fiber housing V-groove 8. When the aligner element 1A is clamped, the entire outer surface 30 of the base member 2 contacts the bottom flange section 26, while the top flange section 26 contacts the lid member 3 only through the top positioning protrusion section 27 coupled to the positioning depression section 29. This design assures a positive and stable clamping of the aligner element 1A by the spring clamp 4 so that the clamping force is firmly transferred to the coated fiber 7.

The above design produces a thin space between the top flange section 26 and the lid member 3, as illustrated in FIGS. 4, 5, and the presence of this space enables to bend the top flange section 26 away from the bottom flange section 26 so as to permit removal of the aligner element 1A out of the spring clamp 4 by decoupling the top positioning depression section 27 from the positioning depression section 29 which holds down the lid member 3.

The flange sections 26 are separated into three sections by two slits 12 provided along the longitudinal direction of the spring clamp 4, and are located at opposite locations in both flange sections 26, at the boundaries between the middle lid 17 and the terminal lids 18. Therefore, it is possible to individually adjust the clamping force applied to those sections of the coated fiber 7 disposed under the middle lid 17 or the terminal lids 18, by the clamping action provided by the separated regions of the spring clamp 4, each of which can act as an independent clamping section. The spring clamp 4 may have a plurality of spring sections.

The U-shaped spring clamp 4 can be fabricated more easily compared with other shapes such as C-shaped clamps, and especially, this shape is advantageous when forming the slits 12. Furthermore, compared with the spring actions of the C-shaped slitted clamps, deformation in one spring section of the U-shaped clamps does not affect the clamping force in other spring sections, and therefore, they are much more convenient to handle and facilitate the task of connecting, disconnecting or switching the optical circuit made by the coated fiber 7.

The following is an explanation the operation of the first embodiment mechanical splice and the advantages that are provided.

The optical fiber mechanical splice 1 enables to connect two optical fiber 7 by inserting a wedge 24 into the wedge insertion opening 25 to relieve the compression force between the base member 2 and the lid member 3 (refer to FIG. 5), inserting the fibers 7 from both fiber entry opening 21 of the aligner element 1A, and abutting the ends which are disposed on top of the fiber housing V-groove 8.

In more detail, the installation process involves the steps of pushing the coated fiber 7 towards the fiber housing V-groove 8 from each end of the fiber entry openings 21; guiding the bare fiber 7a, which had been pre-arranged at the end of the coated fiber 7, on the low-precision groove 9 to reach the guide section 10; and further pushing the coated fiber 7 deeper into the guide section 10 so that the fibers become increasingly accurately aligned. Therefore, it is possible to smoothly feed the cable into the aligner element 1A without having the coated fiber 7 hung up on their way by some obstacle. It should be noted that installation problems are not encountered even though the bare fibers 7a are quite susceptible to bending compared with the clad cable and the bare fiber 7a can be derailed out of the guide section 10 through a space formed by the insertion of the wedges 24. This is because the bare fibers 7a are confined by the small walls 11 formed on both sides of the guide section 10, and it is possible to feed the bare fiber 7a towards the fiber housing V-groove 8 without derailing it from the guide section 10. Even if the separation between the base member 2 and the lid member 3 is made somewhat larger, there is no fear of the small wall 11 pulling away from the small wall accommodation cavity 13. What this means is that even when large diameter fibers, which require a larger separation between the base member 2 and the lid member 3, are being installed, insertion of bare fiber 7a into the fiber housing V-groove 8 can be carried out using the present design of the fiber aligner element 1A. Therefore, the present embodiment of the aligner element is applicable to a wide range of diameters of optical fibers.

It should also be noted that the opening size of the guide section 10 is chosen such that the cladding of the coated fiber 7 cannot pass through, therefore, it is possible to adjust the insertion length into the aligner element 1A by adjusting the length of the bare fiber 7a.

When the aligner element 1A is made of a clear resin material, the progress of insertion of the coated fiber 7 can be visually confirmed, and when an opaque spring clamp 4 is installed on the element 1A, there is still sufficient visibility through the open section 23 of the spring clamp 4 to permit visual observation of the condition of insertion to facilitate the cable installation operation.

When the operation of abutting the two fibers 7 is completed, the wedges 24 are removed from the wedge insertion openings 25, and the elastic force of the spring clamp 4 forces the optical fiber 7 to be compressed between the base member 2 and the lid member 3 to maintain the optical alignment of the optical fibers 7.

When it is desired to alter the optical connection of the optical fibers 7, line switching can be carried out readily by reinserting the wedges 24 into the wedge insertion openings 25 to release the clamping force applied on the optical fiber 7. By selecting an appropriate wedge insertion opening 25 to have the wedge 24 inserted, it is possible to release the clamping force on one side of the filters 7 only, thus facilitating line switching operation.

Another advantage of the design of the mechanical splice 1 is that, because the wedge insertion opening 25 is exposed at the open section 23 of the spring clamp 4, the insertion operation of wedge 25 into the wedge insertion opening 25 can be carried out efficiently while visually observing the progress of insertion. Further, the design permits the optical fiber mechanical splice 1 to be assembled simply by pushing the aligner element 1A into the spring clamp 4 by inserting it through the open section 23 thereby facilitating its assembly operation. For disassembly of the optical fiber mechanical splice 1, it only needs to elasticity force the flange section 26 apart to remove the aligner element 1A out of the spring clamp 4. As well, the external shape of the mechanical splice 1 is such as to prevent it from rolling freely on a workbench, and to be gripped with a tool. These external features offer practical advantages of improving work productivity.

Additionally, the spring clamp 4 has a simple shape and is easy to manufacture. The design of the mechanical splice 1 is such that it can be made into a compact unit, because the flange section 26 provided on the central side of the lid member 3 needs only to be large enough to permit manual opening by the worker. The overall result is that the manufacturing cost of the mechanical splice 1 can be reduced.

Figure 6:
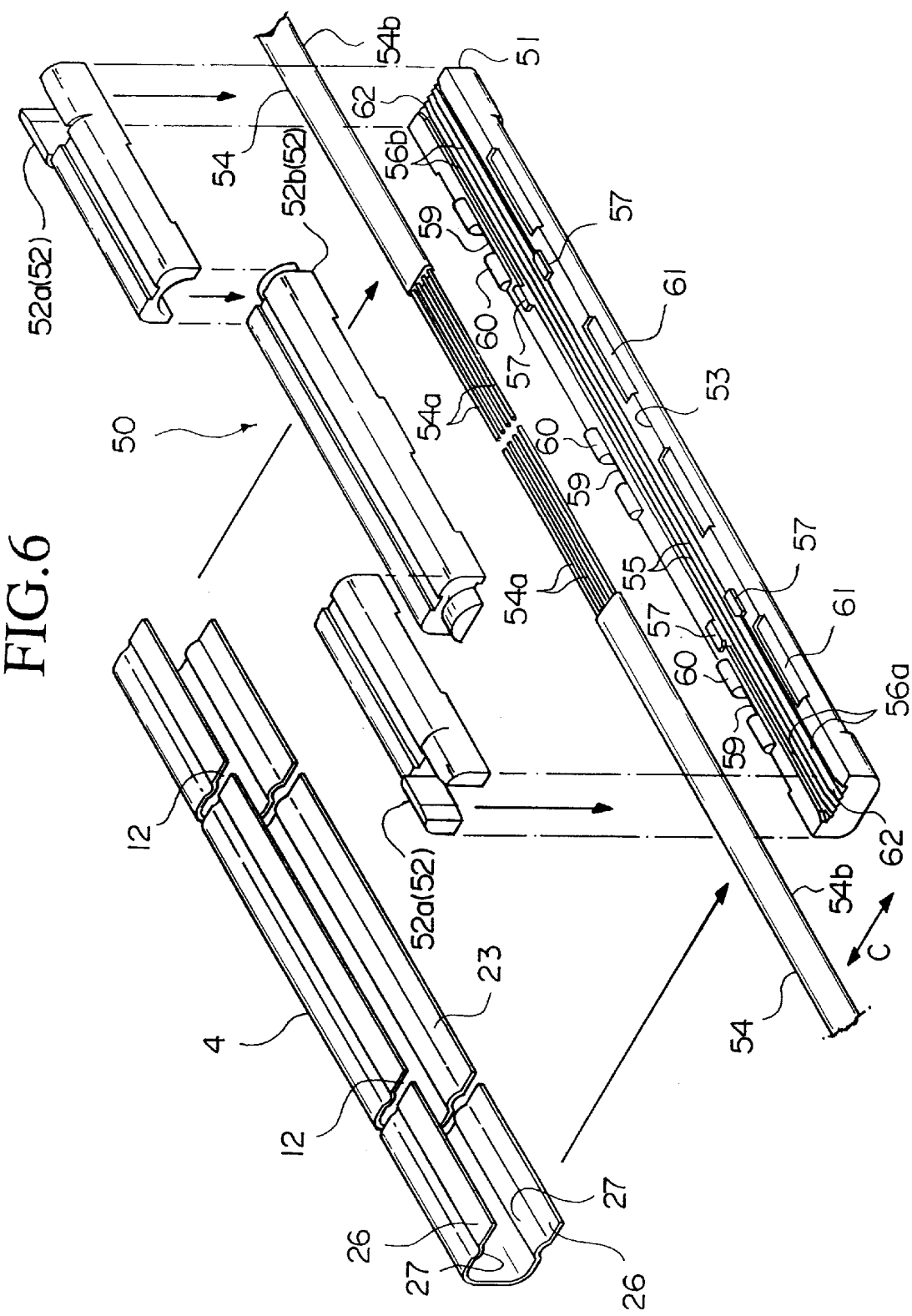
FIG. 6 is an exploded perspective view of a second embodiment of the optical fiber mechanical splice of the present invention.
Figure 7:
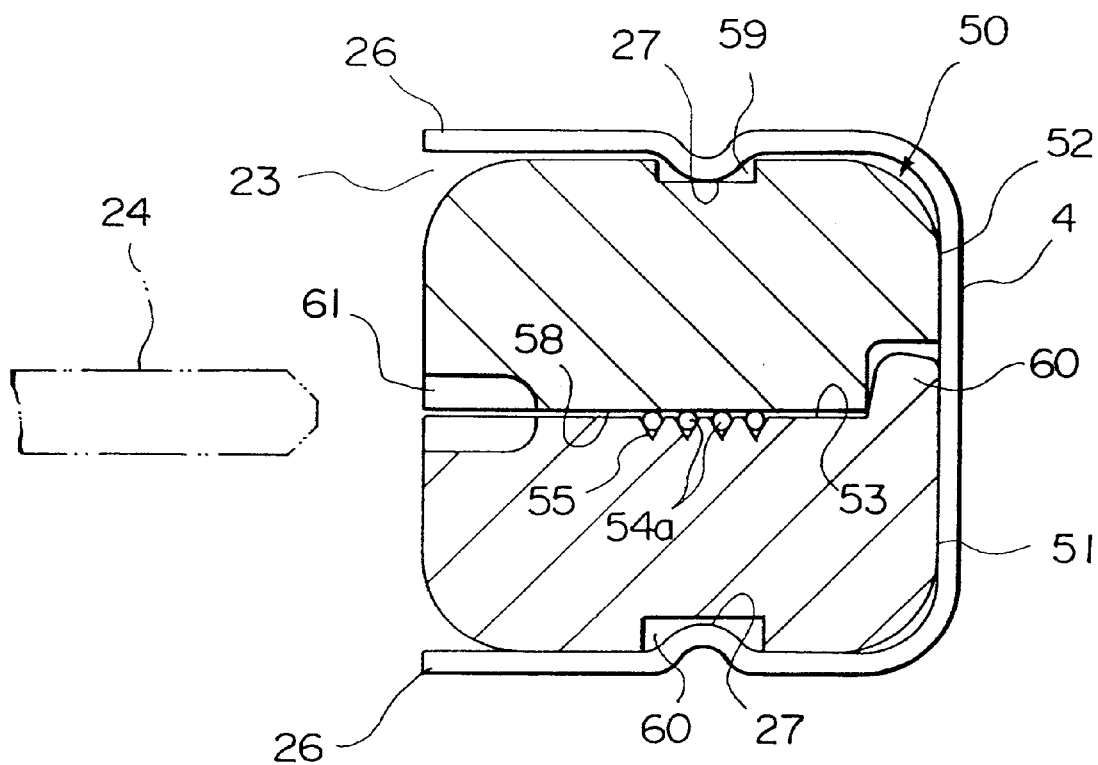
FIG. 7 is a cross sectional view of a vicinity of the fiber housing V-groove of the optical fiber mechanical splice shown in FIG. 6.
Figure 8:
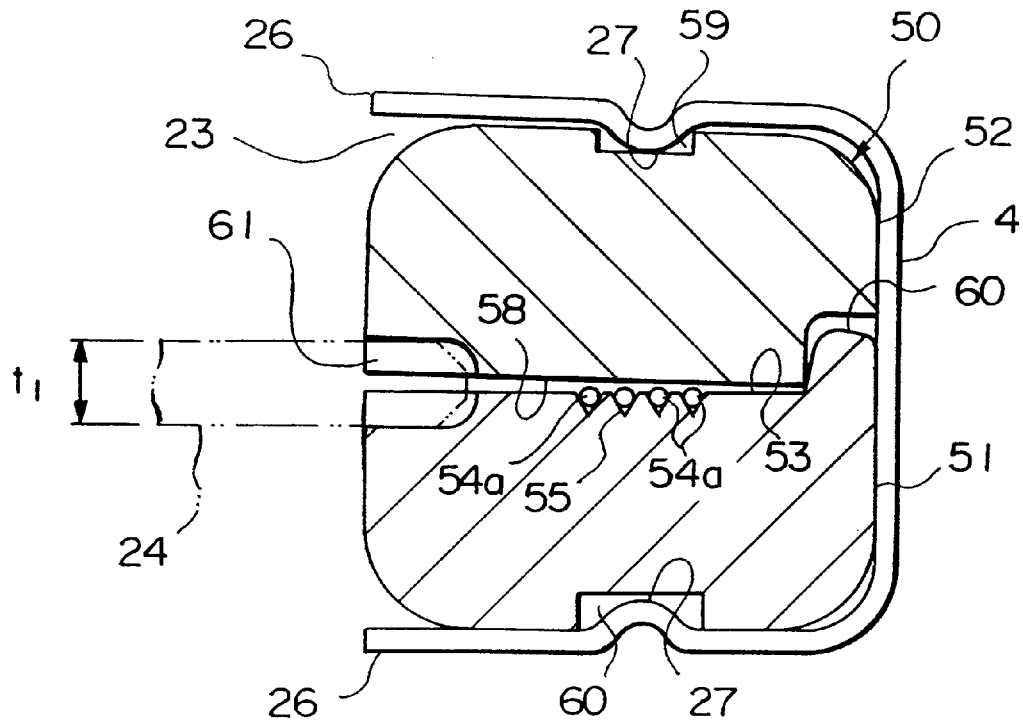
FIG. 8 is a cross sectional view of a vicinity of a fiber housing V-groove showing insertion of wedges in the aligner element to release the clamping force on the fiber tape housed in the optical fiber mechanical splice shown in FIG. 6.

A second embodiment of the optical fiber mechanical splice will be presented with reference to FIGS. 6 to 8.

In the drawings, 50 corresponds to the aligner element to be inserted into the spring clamp, 51 to the base member, and 52 to the previous lid member.

The aligner element 50 is a split rod of a rectangular cross sectional shape, and comprised by rectangular shaped halves of a split rod, respectively constituting a base member 51 and a lid member 52.

The aligner element 50 is closed by contacting the opposing surfaces 53 of the lid member 52 and the base member 51. The base opposing surface 53 of the base member 51 is provided with a plurality of tape housing grooves 55 which are parallel to each other and extending in the longitudinal direction of the base member 51. The tape housing grooves (henceforth referred to as tape-grooves) 55 are used to accommodate optical fiber tape core (henceforth referred to as tape core) 54 having bare fibers 54a at their terminal ends, for the purpose of abutting, positioning and aligning the bare fibers 54a. At the longitudinal ends of the base member 51, there are provided low-precision tape grooves 56 (56a, 56b) extending in the longitudinal direction of the tape-grooves 55 for the purpose of guiding the bare fibers 54a from the tape entry opening of the aligner element 50 towards the tape-groove 55.

On both lateral sides of the low-precision tape grooves 56 adjacent to the tape-grooves 55, a pair of protruding small walls 57 are formed integrally with the resin base member 51. The small walls 57 are arranged in a taper so that their transverse separation distance becomes progressively narrower as they approach towards the tape-grooves 56. Also, the small walls 57 are accommodated in the corresponding small wall housing cavities (not shown) provided on the opposing lid surface 58 when the lid member 52 is closed on the base member 51 (refer to FIGS. 7, 8) to position the lid member 52 with respect to the base member 51.

Those regions of the low-precision tape grooves 56 bounded by the small walls 57 have a higher alignment precision than the rest of the low-precision tape grooves 56.

In the transverse direction (shown by the arrow C in FIG. 6) on a lateral section of the opposing surfaces 53, 58, respectively, for the base member 51 and the lid member 53, there are provided depression engaging sections 59 and protrusion engaging sections 60, as in the case of the first embodiment having depression engaging section 14 and the protrusion engaging section 15, to serve as a hinge device. Similar to the first embodiment, wedge insertion openings 61 are provided also on the opposite lateral side of the aligner element 50.

On each longitudinal end of the low-precision tape grooves 56 on the base member 51, there is provided an entry guide section 62 extending into the opposing base surface 53, which increases its depth towards the exterior end of the base member 51 so that even when the aligner element 50 is closed, the tape core 54 can readily be inserted The lid member 52 is a three-component body and comprises a middle lid 52b and two terminal lids 52a so as to enable exerting separate clamping forces on the aligner element 50 through the action of the three sections of the spring clamp 4 having two slits 12. The terminal lids 52a and the middle lid 52b correspond to the interconnected sections disclosed in claim 6.

In preparation for inserting a tape core 54 into the present mechanical splice, a suitable length of the tape core 54 fitting the length of the tape-grooves 55 is stripped to expose the bare fiber 54a at their tips, and each bare fiber 54a is inserted into the entry guide section 62 along a corresponding low-precision tape grooves 56 until they all reach the tape-grooves 55. The cladding section 54a of the tape core 54 rides on top of the low-precision tape grooves 56 as the bare fibers 54a are inserted through a given distance into the tape-grooves 55, and when the aligner element 50 is closed, the cladding section 54a is clamped between the terminal lid member 52a and the base member 51.

The operation and the advantages of the second embodiment aligner will be presented in the following.

To optically connect two tape cores 54 by abutting their ends, the clamping force between the base member 51 and the lid member 52 is relieved first by inserting the wedges 24 into the wedge insertion openings 61, then the bare fibers 54a, which had been prepared to expose the bare fiber at the ends of the tape core 54, are inserted into the low-precision tape grooves 56 through the entry guide section 62 at both ends of the aligner element 50 until the ends of the bare tape cores 54 are abutted in the tape-grooves 55. In this process, the ends of the bare fibers 54a of the tape cores 54 are guided by the small walls 57 while moving from the low-precision tape grooves 56 to the tape-grooves 55, thus enabling the bare fiber 54 to enter the aligner element 50, without any danger of derailing the individual fibers on their way into the tape-grooves 55. Therefore, the present aligner 50 makes it possible to abut and connect two tape cores 54 by simply inserting them through the entry guide openings of the aligner element 50.

It should be mentioned also that those bare fibers 54a which are disposed on the inner side of the taped array do not tend to protrude beyond those bare fibers 54a which are disposed on the outer side of the taped array, this is because, so long as the outer fibers 54a are inserted properly into their respective tape-grooves 55, the inner fibers 54a are naturally directed to the proper respective tape-grooves 55. For this reason, the small walls 57 need only be provided along both lateral sides of the low-precision tape grooves 56.

What is claimed is:

1. An optical fiber mechanical splice, for providing an optical connection by abutting optical fibers, comprising:

an aligner element having a split-rod configuration comprised of a base member and a lid member for clamping an optical fiber in-between to provide a cable housing unit, wherein said alignment element can be opened by a wedge inserted under pressure from a side;

a spring clamp having a U-shaped profile for retaining said cable housing unit closed by clamping said aligner element within an open section and providing vertical compression forces;

a fiber housing groove, for retaining said optical fiber inserted between opposing surfaces which are formed on an opposing lid surface of said lid member and/or an opposing base surface of said base member;

wherein said open section is shaped to enable insertion of said aligner element, and a longitudinal middle section of said fiber housing groove is shaped to accommodate abutted base optical fibers for optical aligning, and said fiber housing groove is arranged so as to enable optical aligning of said optical fibers inserted through each end of said aligner element by abutting said bare optical fibers in said longitudinal middle section.

2. An optical mechanical splice as claimed in claim 1, wherein said aligner element is positioned in a predetermined location within said spring clamp by having a coupling configuration provided by a protrusion positioning section formed on each flange section of said spring clamp, and a depression positioning section formed on each outer surface of said lid member and said base member.

3. An optical mechanical splice as claimed in claim 2, wherein said base member and lid member have a halved-rod shape, and said aligner element is assembled into said split-rod shape by aligning said base member and said lid member in the longitudinal direction, and a length of said spring clamp is approximately equal to a length of said aligner element, and said coupling configuration comprises formations extending approximately over an entire longitudinal lengths of said flange sections of said spring clamp.

4. An optical mechanical splice as claimed in claim 3, wherein one of either said base member or said lid member is made of a plurality of interconnected sections, and said spring clamp comprises transverse slits fabricated at boundaries of said interconnected sections so as to enable said spring clamp to function as a plurality of individual clamping sections.

5. An optical mechanical splice as claimed in claim 1, wherein a low-precision groove, having a lower alignment precision relative to an alignment precision of said fiber housing groove, is provided at each longitudinal end of said aligner element to communicate with said fiber housing groove so as to enable an optical fiber to be inserted in said fiber housing groove from each entry guide section of said low-precision groove.

6. An optical mechanical splice as claimed in claim 5, wherein a plurality of small walls are provided along a lateral side of each of said low-precision grooves in a vicinity of boundaries between interconnected sections for preventing said optical fibers being inserted from derailing out of said fiber housing groove or low-precision grooves.

7. An optical mechanical splice as claimed in claim 6, wherein small walls protrude from either said base member or said lid member, and small wall accommodation cavities for housing said small walls are provided on an opposing lid member or a base, member for locating said lid member with respect to said base member.

8. An optical mechanical splice as claimed in claim 5, wherein said assembly is provided with a plurality of parallel middle grooves of a given alignment precision and an equal number of parallel end grooves having a lower alignment precision communicating with said middle grooves so as to provide a one-on-one correspondence of grooves, wherein said end grooves are spaced apart wider than middle grooves, and in a vicinity of said small walls, and said end grooves diverge towards respective terminal ends.

9. An optical mechanical splice as claimed in claim 1, wherein said fiber housing groove has a V-shape or a U-shape profile.

* * * * *